US007562042B2

(12) United States Patent
Lo et al.

(10) Patent No.: US 7,562,042 B2
(45) Date of Patent: Jul. 14, 2009

(54) DATA PROCESSOR FOR IMPLEMENTING FORECASTING ALGORITHMS

(75) Inventors: Andrew W. Lo, Lexington, MA (US); Harry Mamaysky, Stamford, CT (US); Jiang Wang, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1319 days.

(21) Appl. No.: 09/828,519

(22) Filed: Apr. 6, 2001

(65) Prior Publication Data

US 2002/0007331 A1    Jan. 17, 2002

Related U.S. Application Data

(60) Provisional application No. 60/195,540, filed on Apr. 7, 2000.

(51) Int. Cl.
*G06Q 40/00* (2006.01)

(52) U.S. Cl. .......................................... 705/37; 705/35

(58) Field of Classification Search .................. 705/36, 705/37, 35, 38, 44, 14
See application file for complete search history.

(56) References Cited

U.S. PATENT DOCUMENTS

| 4,414,629 | A | * | 11/1983 | Waite | 364/300 |
|---|---|---|---|---|---|
| 5,412,769 | A | * | 5/1995 | Maruoka et al. | 345/440 |
| 5,444,819 | A | * | 8/1995 | Negishi | 395/22 |
| 5,454,104 | A | * | 9/1995 | Steidlmayer et al. | 395/600 |
| 5,682,465 | A | * | 10/1997 | Kil et al. | 395/23 |
| 5,761,442 | A | * | 6/1998 | Barr et al. | 705/36 R |
| 5,946,666 | A | * | 8/1999 | Nevo et al. | 705/36 |
| 6,012,042 | A | * | 1/2000 | Black et al. | 705/36 |
| 6,018,722 | A | * | 1/2000 | Ray et al. | 705/36 |
| 6,313,833 | B1 | * | 11/2001 | Knight | 705/36 R |
| 6,330,546 | B1 | * | 12/2001 | Gopinathan et al. | 705/35 |
| 6,456,982 | B1 | * | 9/2002 | Pilipovic | 705/36 |
| 7,216,299 | B2 | * | 5/2007 | Knight | 715/764 |
| 2002/0007331 | A1 | * | 1/2002 | Lo et al. | 705/36 |
| 2002/0030701 | A1 | * | 3/2002 | Knight | 345/810 |

OTHER PUBLICATIONS

Castiglione, F., "Forecasting Price Increments using an artificial Neural Network", Advanced Complex Systems (2000) 1, 1-12.*
"Dictionary of Finance and Investment Terms" by John Downes and Jordan Elliot Goodman, Barrons Financial Guides (5 pages attached).*
Author(s): Kamijo, K.; Tanigawa, T. Stock price pattern recognition-a recurrent neural network approach, IJCNN International Joint Conference on Neural Networks (Cat. No. 90CH2879-5) p. 215-21 vol. 1 Publisher: IEEE, New York, NY, USA, Conference Date: Jun. 17-21, 1990.*

* cited by examiner

*Primary Examiner*—Jagdish N Patel
(74) *Attorney, Agent, or Firm*—Morgan, Lewis & Bockius LLP; Steven D. Underwood

(57) ABSTRACT

A data processing system and method for developing predictions regarding future asset price movements, based on pattern detection in a time sequence of historical price data. The system includes computer implementation of a kernal regression to effect a smooth estimator of the non-linear price-time relationship. As tested against known patterns, the system provides an expectation regarding a future price movement.

5 Claims, 3 Drawing Sheets

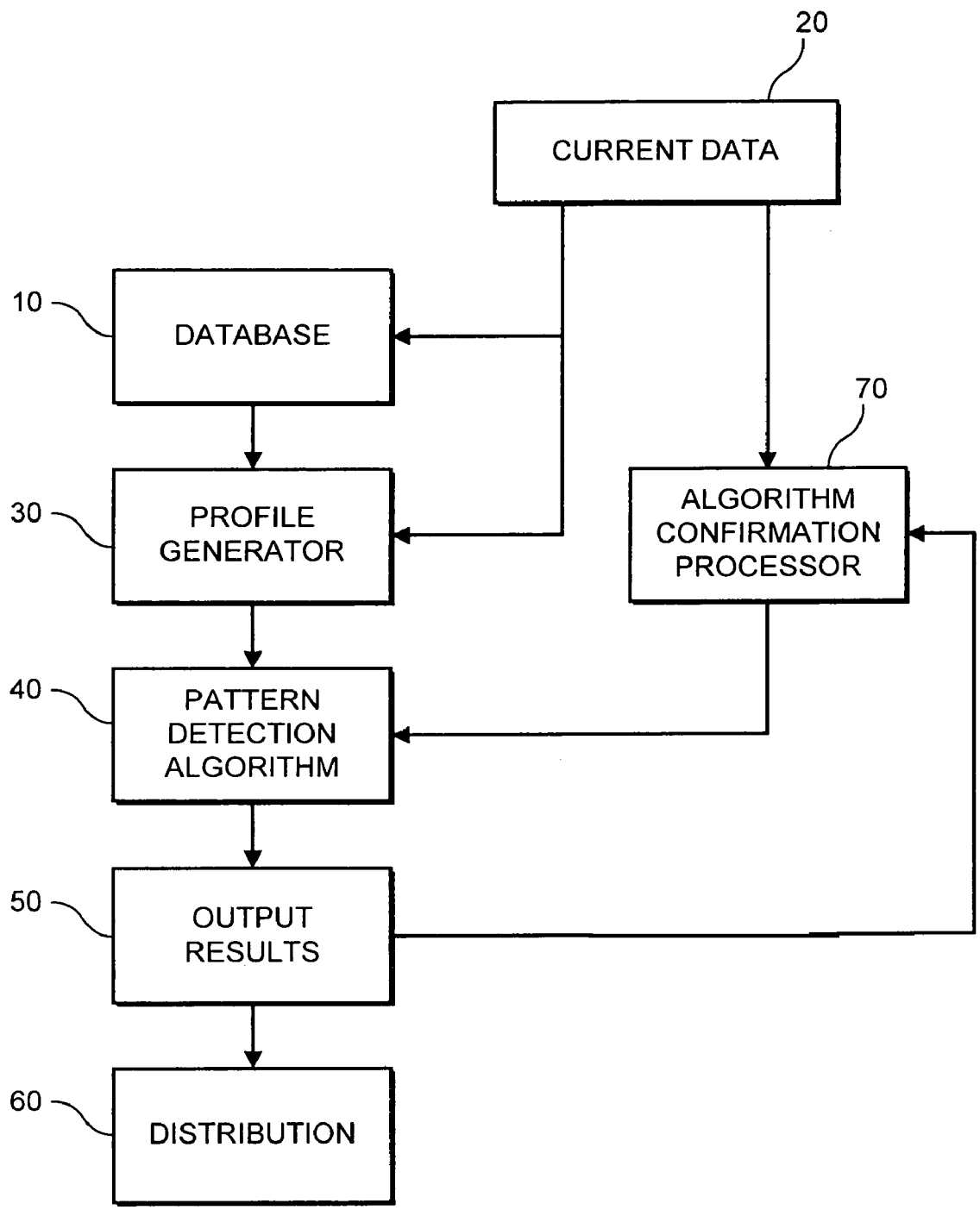
F I G. 1

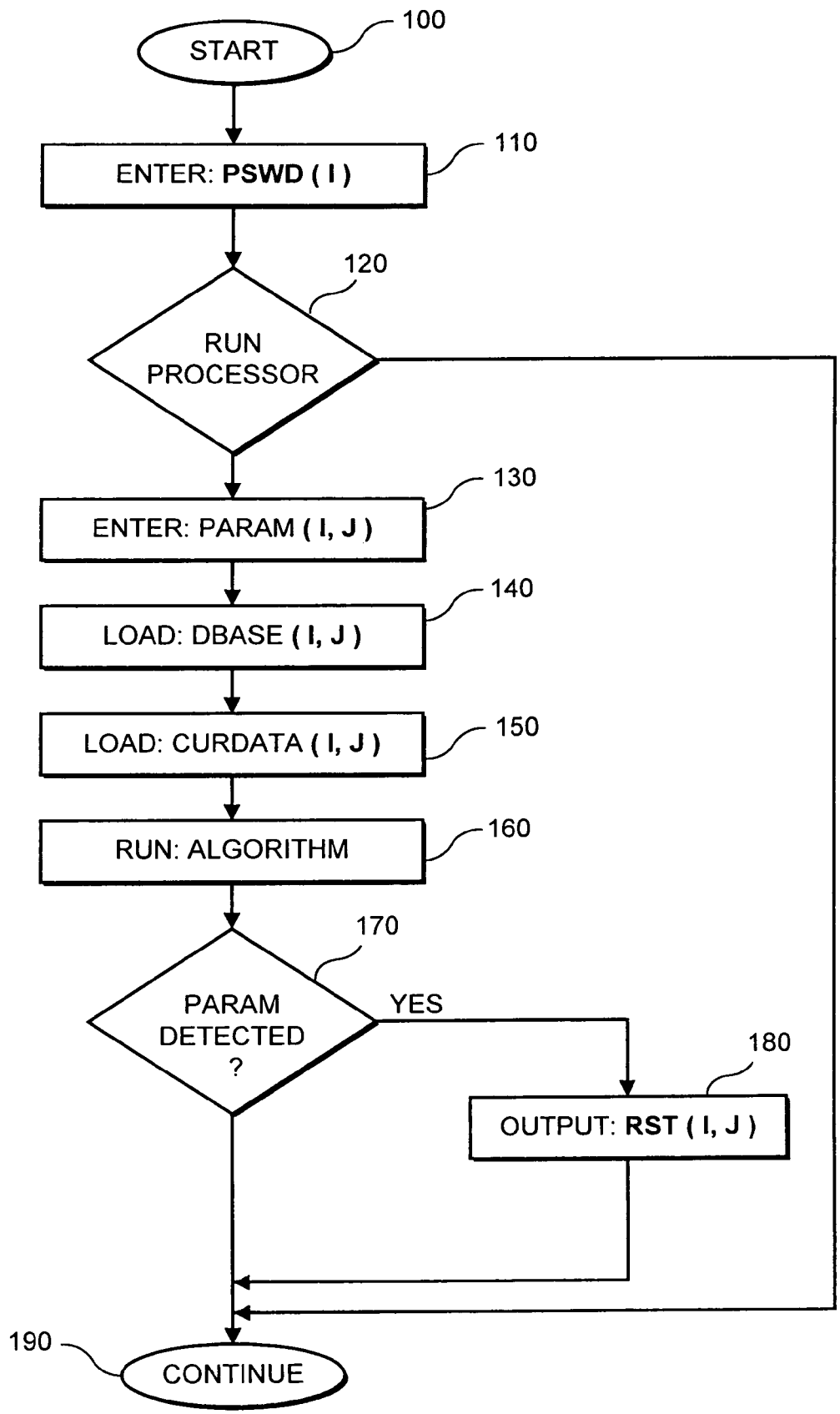
F I G. 2

DATA PROCESSOR FOR IMPLEMENTING FORECASTING ALGORITHMS

STATEMENT OF RELATED CASE

The present patent application relies and is based upon Provisional Application No. 60/195,540, filed on Apr. 7, 2000, entitled FOUNDATIONS OF TECHNICAL ANALYSIS: COMPUTATIONAL ALGORITHMS, STATISTICAL INFERENCE, AND EMPIRICAL IMPLEMENTATION, by Andrew W. Lo, Harry Mamaysky, and Jiang Wang, the disclosure of which is incorporated herein by reference.

FIELD OF THE INVENTION

The present invention is generally directed to a data processing system and method for developing forecasts relating to future financial asset valuations. More specifically, the present invention is directed to a computer system for analyzing historical data relating to financial asset valuations and applying pattern recognition algorithms to develop forecasts of future asset valuations.

BACKGROUND OF THE INVENTION

Perhaps the most famous disclaimer on Wall Street is that "past performance is no guarantee of commensurate future returns." While popular with the lawyers advising the promoters of mutual funds and the like, the above disclaimer is in fact contrary to an entire body of investment advisory techniques—known as technical analysis. Technical analysts collect large amounts of price data for select securities and graphically display the price v. time relationships for select periods. The resulting charts are then examined with the learned eye of the technical analyst with the hope of recognizing one or more familiar patterns in the recent price data on the chart. Through experience, patterns of price movements have been associated with future price increases (bullish sentiments) or alternatively, price drops (bearish sentiments).

Technical analysis, on one level, is largely an exercise in human interpretation of complex graphics, as the data relating to price movements—say stock in a corporation—is charted in Cartesian coordinates for review. Applying this technique at its most basic level eschews traditional tools of investment analysts such as price-earning ratios, projected revenue growth, and the like. Indeed, the technical analyst—at this basic level—wholly ignores the attributes underlying the asset, focusing instead on the raw price data as a meaningful projector of future price movements.

While many professionals on Wall Street feel uncomfortable about the usefulness of visual patterns in historical price movements as an important projector of short term future price movements, studies reflect its predictive capabilities. Indeed, it is a tool with significant potential for hedging, day-trading, momentum trading, managing mutual funds, risk management, and the like. Coupled with other analytical tools, and traditional investigatory techniques, sophisticated investors are greatly assisted in discerning the type of investment selection to be made—either for themselves or as advisors for others—such as large institutions, pension funds, or mutual fund companies.

Pattern recognition is an important process in a number of fields. For example, forensic evidence relies on pattern recognition for correlating fingerprint samples, handwriting analysis, and face recognition. Sophisticated software has been developed to assist in handwriting recognition and optical character recognition ("OCR") apply computers to detect and assess patterns for translation into known logical syllogisms.

Returning to Wall Street, recent trends include the application of large computer systems for intensive fundamental analysis in support of select investment strategies. While technical analysis, as discussed above, relies on human recognition of graphical patterns (shapes) in price—time charts, fundamental analysis applies established mathematical techniques—both algebraic and numerical. More grounded in accepted financial engineering principles, fundamental analysis was quickly adopted and branded as scientific, to contrast it from the more ethereal "technical analysts." This has resulted in a lesser role for technical analysis in investment forecasting and security selection.

It has been, however, established that forms of technical analysis do, in fact, provide meaningful predictions of future price trends. Within the thicket of subjective analysis and buried by the specialized jargon, a potentially powerful investment tool remained essentially unrealized. See, specifically, "Foundations of Technical Analysis: Computational Algorithms, Statistical Inference, and Empirical Implementation" by Andrew W. Lo, Harry Mamaysky, and Jiang Wang, published in The Journal of Finance, Vol. LV, No. 4, August 2000, pp. 1705-1765—the contents of which are incorporated by reference as if restated in full. It was with this understanding of the problems with the prior art that provided the impetus for the present invention.

OBJECTS AND SUMMARY OF THE PRESENT INVENTION

It is thus an object of the present invention to provide an investment advisory system that applies technical analysis in an objectively analytical framework to develop projections on future pricing events of select securities.

It is another object of the present invention to provide an investment management system for assessing current and past pricing trends on securities and, based thereon, formulate investment strategies.

It is still another object of the present invention to provide an investment advisory method wherein past price data is plotted and assessed by software to detect patterns that are predictive of future price movements.

It is yet another object of the present invention to provide a computer data processing system for collecting and organizing historical price data for select financial assets and processing the historical data to detect patterns predictive of future price movements for the select financial assets.

It is a further object of the present invention to provide a data processing system that uses historical price and volume data to generate a non-linear relationship using a smoothing estimator to develop a pattern revealing numerical assessment for projecting future price movements.

It is still another object of the present invention to provide a feedback mechanism to adjust the smoothing estimator parameters based on the performance of past projection efforts.

It is another object of the present invention to provide a data processing system to support distribution of price movement projections and recommendations to market traders.

Some, if not all, of the above objects of the present invention are realized in a specific illustrative computer system implementation utilizing a smoothing estimator equation to provide a non-linear representation of a two-dimensional graphical pattern of price. The computer system first creates the non-linear relationship based on current and/or past pricing data for select periods and on specified intervals. The smoothing estimator reduces observational errors by averaging the data in sophisticated ways. The non-linear relationship is then tested for patterns known to be associated with a future price movement, with detection of such a pattern triggering a Results ("RST(I, J)") output. This RST output is tested and then used to support predictions and recommendations based on expected future price movements, in the form of an numerical index—positive for bullish sentiments and negative for bearish sentiments, with the magnitude reflecting a confidence level. Variations of the index include the use of secondary factors, such as trading volume.

Additional features of the present invention include the ability to test and modulate the smoothing estimator. Specifically, the system records the projections, RST, and then at some point in the future compares these to actual price movements. Failure to fit within a selected pricing criteria provokes a parameter modulation, wherein the co-efficients of the smoothing estimator are adjusted to enhance predictive accuracy.

While the primary objective of the present invention is to recognize patterns that are now well known as predictors of future movement, such as "head and shoulders" and the "double bottom," a further object is to associate past price patterns—as yet unrecognized—with price movements, so as to ascertain patterns that have predictive value, but are otherwise visually hidden from human recognition. The present invention is applicable for predictions for the prices of many different types of securities, such as equities, debt instruments, futures, options, indexes, and other derivative instruments The present invention is better understood by review of a specific illustrative embodiment thereof provided hereinbelow in a detailed description, including the following figures, of which:

BRIEF DESCRIPTION OF THE FIGURES

FIG. 1 is a functional block diagram of the specific system components for use in practicing the present invention;

FIG. 2 is a logic defining block diagram describing system operation in support of the present invention.

DETAILED DESCRIPTION OF THE INVENTION

Figure 3:
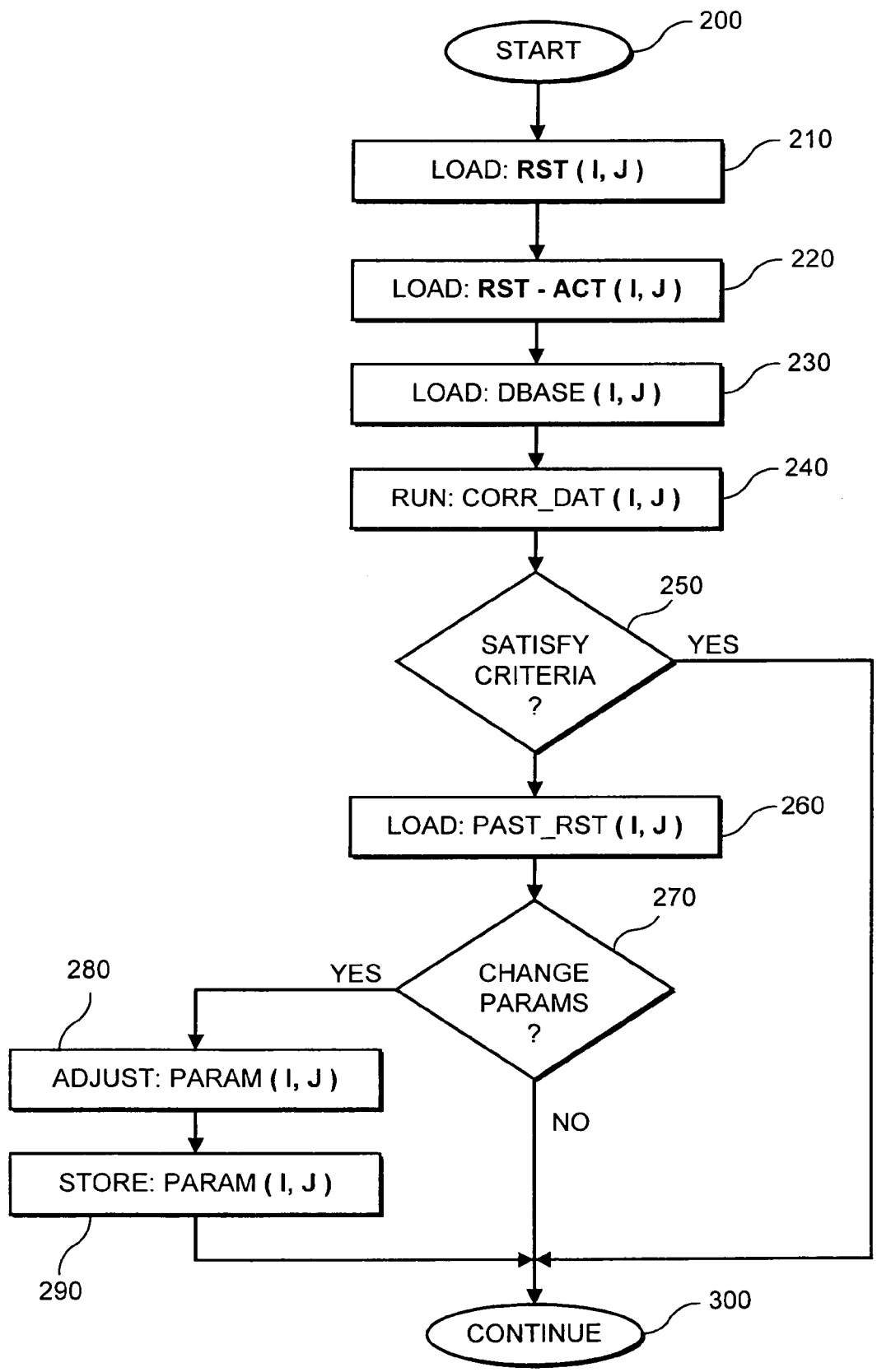
FIG. 3 is a logic defining block diagram further describing system operation in support of another aspect of the present invention.

First briefly in overview, the present invention is directed to a computer system programmed to process large amounts of data relating to asset transactions and/or pricing. The system includes either a dedicated database or a communication port linking to a remote data source for access to the requisite data. At select intervals, either event driven, periodic, or by request, data is pulled from the database and placed in CPU associated memory in preparation for processing. A smoothing estimator equation is selected and the data processed, creating the smoothly shaped, price curve. See the exemplary kernel regression described in the co-pending provisional patent application referenced above. This curve is then numerically (and globally) tested against stored predictive patterns ("PP"). A positive response triggers a result file, with a future price movement prediction. The Result is placed into a report ("report generator") for review and/or distribution on a selected basis, e.g., subscription and the like.

The system includes various adjustable parameters for customized application. For example, data periods can be adjusted to cover short time frames—ranging from minutes to hours. Alternatively, the relevant time period can stretch to weeks or even months. In one embodiment, discussed below, price data is taken from "end of trade day" in New York. Of course, the time period selected will influence the predictive power of the associated and detected shapes. In fact, the program parameters, such as h (bandwidth) will differ for the selected application of the smoothing algorithm.

Over time, the system begins to detect and associate patterns that are otherwise difficult or impossible to visually discern. This learning and feedback function provides pattern associations not humanly readable, but otherwise predictive of future price movements. These are stored in the database with the visually detectable patterns and applied to historical price trends consistent with the process used for the original set of patterns.

Data inputs to the system include data feeds on price, volume, and/or trade size and are received in digital form from data vendors, such as Reuters, Bloomberg, and Standard & Poor. System hardware will depend on the scale of operation and includes Sun Microsystems Enterprise Class Servers, and Terabyte systems disk arrays, applying Oracle® software controlled database. The System Results Output can be used internally to support trading or distributed on a fee-based subscription basis.

With the foregoing overview in mind, attention is first directed to FIG. 1 which provides a functional block diagram of the subsystems supporting the invention. A central (local) database is provided at block 10, storing price data and selected programming including numerical implementations of the requisite smoothing estimators. This local database is updated with current price data from subscription service, block 20, via asynchronous feed. At block 30, the CPU processes the price data and develops the shaped curves from the smoothing estimator. Once generated, the system tests the curve using numerical analysis against the stored library of predictive patterns, block 40. The results are processed at block 50—report generator—and then passed to distribution, block 60. The results are further passed to the algorithm confirmation processor, block 70, stored and then later processed by reference to future (then current) pricing to discern predictive accuracy in the forecasting. Sequential operations is controlled by Counters I and J.

The high level logic governing the processing of the system of FIG. 1 is depicted in the flow chart of FIG. 2. Logic conceptually begins at block 100, and entry of the User's password at block 110, authorizing access to the main menu for system configuration and operation. In practice, the main menu includes many choices for the User to configure the system for predictive processing. This will include selection and configuration of the predictive algorithm, the parameters for use with the selected algorithm, and the period and sampling frequency. For illustrative purposes, the diagram depicts the simple processing of the selected algorithm, test 120—with a negative selection ending processing. Once selected, the parameters are entered, block 130, controlling the curve generation. At block 140, the actual historical data is formatted in a system readable matrix dbase(I,J); this is concatenated with the selected current market data, block 150, and processed in the algorithm, block 160, to create the smooth curve. At test 170, the curve is tested for patterns—if positive, logic branches to block 180 and the system generates a results file, RST(I,J) providing the predictive association. Logic continues for the next sequence, via block 190.

Turning now to FIG. 3, as results are generated, these are used to compare with actual price movements and assess the predictive character of the patterns, and to modulate the algorithm to enhance predictive performance. Logic begins at block 200 and continues to the sequence of data loads, block 210, beginning with the results file. At block 220, the actual price movement results are loaded and coupled with the underlying historical price data, at block 230. The system runs a correlation for each such entry point in the data set and then assesses the confidence levels obtained from the predictions, block 240.

A convergence criteria is pulled and then used to measure the character of the predictions. If the criteria is not satisfied, the algorithm is pulled, block 260, and the parameters adjusted, via test 270 and blocks 280-290.

The operative characteristics of the present invention are better understood in the context of a specific example, provided below:

EXAMPLE

The system and method begins with the premise that prices of a selected asset evolve in a non-linear fashion, but contain certain patterns within the noise. As provided in the above-noted (and incorporated) paper, quantitative analysis begins with the following expression:

$$P_t = m(X_t) + \epsilon_t, \; t=1, \ldots, T, \quad (1)$$

where $m(X_t)$ is an arbitrary fixed but unknown non-linear function of a state variable $X_t$, and $\{\epsilon_t\}$ is white noise. The smoothing function m(1) is constructed by setting the state variable equal to time, $X_t = t$. Exemplary smoothing functions include kernal regression, orthogonal series expansion, projection pursuit, nearest neighbor estimators, average derivative estimators, splines, and neural networks. To enhance the smoothing function, the system uses weighted averages of the $P_t$s where the weights decline as $X_t$s get farther away from $\chi_0$, providing a "local averaging" procedure in estimating $m(\chi)$. The selected weighting must be sufficient to create a smoothed curve, but not so influential as to hide the pattern creating non-linearities in the data.

More formally, for any arbitrary $\chi$, a smoothing estimator of $m(\chi)$ may be expressed as $$m(x) \equiv \frac{1}{T} \sum_{t=1}^{T} \omega_t(x) P_t \quad (2)$$

where the weights $\{\omega_t(\chi)\}$ are large for those $P_t$s paired with $X_t$s near $\chi$, and small for those $P_t$s with $X_t$s far from $\chi$. To implement such a procedure, we must define what we mean by "near" and "far." If we choose too large a neighborhood around $\chi$ to compute the average, the weighted average will be too smooth and will not exhibit the genuine nonlinearities of $m(\cdot)$. If we choose too small a neighborhood around $\chi$, the weighted average will be too variable, reflecting noise as well as the variations in $m(\cdot)$. Therefore, the weights $\{\omega_t(\chi)\}$ must be chosen carefully to balance these two considerations.

The system here applies a kernal regression, with a weight function $\omega_t(\chi)$, constructed from a probability density function $K(\chi)$ $$K(\chi) \geq 0, \int K(u) du = 1. \quad (3)$$

By rescaling the kernel with respect to a parameter h>0, we can change its spread, i.e., let:

$$K_h(u) \equiv \frac{1}{h} K(u/h), \; \int K_h(u) du = 1 \quad (4)$$

and define the weight function to be used in the weighted average (2) as $$\omega_{t,h}(\chi) = K_h(\chi - X_t)/g_h(\chi), \quad (5)$$

$$g_h(x) \equiv \frac{1}{T} \sum_{t=1}^{T} K_h(x - X_t). \quad (6)$$

If h is very small, the averaging will be done with respect to a rather small neighborhood around each of the $X_t$s. If h is very large, the averaging will be over larger neighborhoods of the $X_t$s. Therefore, controlling the degree of averaging amounts to adjusting the smoothing paramerer h, also known as the bandwidth. Choosing the appropriate bandwidth is an important aspect of any local-averaging technique.

Substituting (6) into (2) yields the Nadaraya-Watson kernel estimator $m_h(\chi)$ of $m(\chi)$:

$$m_h(x) = \frac{1}{T} \sum_{t=1}^{T} \omega_{t,h}(x) Y_t = \frac{\sum_{t=1}^{T} K_h(x - X_t) Y_t}{\sum_{t=1}^{T} K_h(x - X_t)} \quad (7)$$

Under certain regularity conditions on the shape of the kernel K and the magnitudes and behavior of the weights as the sample size grows, it may be shown that $m_h(\chi)$ converges to $m(\chi)$ asymptotically in several ways (see Hardle (1990) for further details). This convergence property holds for a wide class of kernels. For illustrative purpose, we shall use the most popular choice of kernel, the Gaussian kernel:

$$K_h(x) = \frac{1}{h\sqrt{2\pi}} e^{-x^2/2h^2} \quad (8)$$

Selecting the appropriate bandwidth h is clearly central to the success of $m_h(\cdot)$ in approximating $m(\cdot)$—too little averaging yields a function that is too choppy, and too much averaging yields a function that is too smooth. To illustrate these two extremes, Figure II (see "Foundations of Technical Analysis: Computational Algorithms, Statistical Inference, and Empirical Implementation" by Andrew W. Lo, Harry Mamaysky, and Jiang Wang, published in The Journal of Finance, Vol. LV, No. 4, August 2000, pp. 1705-1765—the contents of which are incorporated by reference as if restated in full) displays the Nadaraya-Watson kernel estimator applied to 500 data points generated from the relation:

$$Y_t = \text{Sin}(X_t) + 0.5 \epsilon Z_t, \; \epsilon Z_t \sim N(0,1), \quad (9)$$

where $X_t$ is evenly spaced in the interval $[0, 2\pi]$. Panel II(a) plots the raw data and the function to be approximated.

Kernel estimators for three different bandwidths are plotted as solid lines in Panels II(b)-(c). The bandwidth in II(b) is clearly too small; the function is too variable, fitting the "noise" $0.5\epsilon Z_t$ as well as the "signal" $\text{Sin}(\cdot)$. Increasing the bandwidth slightly yields a much more accurate approximation to Sin(·) as Panel II(c) illustrates. However, Panel II(d) shows that if the bandwidth is increased beyond some point, there is too much averaging and information is lost.

There are several methods for automating the choice of bandwidth h in (7), but the most popular is the cross-validation method in which h is chosen to minimize the cross-validation function:

$$CV(h) = \frac{1}{T}\sum_{t=1}^{T}(P_t - m_{h,t})^2, \quad (10)$$

where $$m_{h,t} \equiv \frac{1}{T}\sum_{T \neq t}^{T} \omega_{T,h} y_T. \quad (11)$$

The estimator $m_{h,t}$ is the kernel regression estimator applied to the price history $\{P_T\}$ with the t-th observation omitted, and the summands in (10) are the squared errors of the $m_{h,t}$s, each evaluated at the omitted observation. For a given bandwidth parameter h, the cross-validation function is a measure of the ability of the kernel regression estimator to fit each observation $P_t$ when that observation is not used to construct the kernel estimator. By selecting the bandwidth that minimizes this function, we obtain a kernel estimator that satisfies certain optimality properties, e.g., minimum asymptotic mean-squared error.

Once the data is converted into a non-linear, smoothed function, this function is tested against the stored library of pattern defining highs and lows with the range.

We focus on five pairs of technical patterns that are among the most popular patterns of traditional technical analysis (see, for example, Edwards and Magee (1966, Chapters VII-X)): head-and-shoulders (HS) and inverse head-and-shoulders (IHS), broadening tops (BTOP) and bottoms (BBOT), triangle tops (TTOP) and bottoms (TBOT), rectangle tops (RTOP) and bottoms (RBOT), and double tops (DTOP) and bottoms (DBOT). There are many other technical indicators that may be easier to detect algorithmically—moving averages, support and resistance levels, and oscillators, for example—but because we wish to illustrate the power of smoothing techniques in automating technical analysis, we focus on precisely those patterns that are most difficult to quantify analytically.

Consider the systematic component m(·) of a price history $\{P_t\}$ and suppose we have identified n local extrema, i.e., the local maxima and minima, of m(·). Denote by $E_1, E_2, \ldots, E_n$ the n extrema and $t^*_1, t^*_2, \ldots, t^*_n$ the dates on which these extrema occur. Then we have the following definitions:

Definition 1 (Head-and Shoulders). Head-and-shoulders (HS) and inverted head-and-shoulders (IHS) patterns are characterized by a sequence of five consecutive local extrema $E_1, \ldots, E_5$ such that:

$$HS \equiv \begin{cases} \{E_1 \text{ is a maximum} \\ \{ \\ \{E_3 > E_1, E_3 > E_5 \\ \{E_1 \text{ and } E_5 \text{ are within 1.5 percent of their average} \\ \{ \\ \{E_2 \text{ and } E_4 \text{ are within 1.5 percent of their average,} \end{cases}$$

$$IHS \equiv \begin{cases} \{E_1 \text{ is a minimum} \\ \{ \\ \{E_3 > E_1, E_3 > E_5 \\ \{E_1 \text{ and } E_5 \text{ are within 1.5 percent of their average} \\ \{ \\ \{E_2 \text{ and } E_4 \text{ are within 1.5 percent of their average,} \end{cases}$$

Observe that only five consecutive extrema are required to identify a head-and-shoulders pattern. This follows from the formalization of the geometry of a head-and-shoulders pattern: three peaks, with the middle peak higher than the other two. Because consecutive extrema must alternate between maxima and minima for smooth functions, the three-peaks pattern corresponds to a sequence of five local extrema: maximum, minimum, highest maximum, minimum, and maximum. The inverse head-and-shoulders is simply the mirror image of the head-and-shoulders, with the initial local extrema a minimum.

Because broadening, rectangle, and triangle patterns can begin on either a local maximum or minimum, we allow for both of these possibilities in our definitions by distinguishing between broadening tops and bottoms.

Definition 2 (Broadening). Broadening tops (BTOP) and bottoms (BBOT) are characterized by a sequence of five consecutive local extrema $E_1, \ldots, E_5$ such that:

$$BTOP \equiv \begin{cases} \{E_1 \text{ is a maximum} \\ \{ \\ \{E_1 > E_3 > E_5 \\ \{ \\ \{E_2 < E_4 \end{cases}, \quad BBOT \equiv \begin{cases} \{E_1 \text{ is a minimum} \\ \{ \\ \{E_1 > E_3 > E_5 \\ \{ \\ \{E_2 < E_4 \end{cases}.$$

Definitions for triangle and rectangle patterns follow naturally.

Definition 3 (Triangle). Triangle tops (TTOP) and bottoms (TBOT) are characterized by a sequence of five consecutive local extrema $E_1, \ldots, E_5$ such that:

$$TTOP \equiv \begin{cases} \{E_1 \text{ is a maximum} \\ \{ \\ \{E_1 > E_3 > E_5 \\ \{ \\ \{E_2 < E_4 \end{cases}, \quad TBOT \equiv \begin{cases} \{E_1 \text{ is a minimum} \\ \{ \\ \{E_1 > E_3 > E_5 \\ \{ \\ \{E_2 < E_4 \end{cases}.$$

Definition 4 (Rectangle). Rectangle tops (RTOP) and bottoms (RBOT) are characterized by a sequence of five consecutive local extrema $E_1, \ldots, E_5$ such that:

$$RTOP \equiv \begin{cases} \{E_1 \text{ is a maximum}\} \\ \{\text{tops are within 0.75 percent of their average}\} \\ \{\text{bottoms are within 0.75 percent of their average}\} \\ \{\text{lowest top} > \text{highest bottom,}\} \end{cases}$$

$$RBOT \equiv \begin{cases} \{E_1 \text{ is a minimum}\} \\ \{\text{tops are within 0.75 percent of their average}\} \\ \{\text{bottoms are within 0.75 percent of their average}\} \\ \{\text{lowest top} > \text{highest bottom,}\} \end{cases}$$

The definition for double tops and bottoms is slightly more involved. Consider first the double top. Starting at a local maximum $E_1$, we locate the highest local maximum $E_a$ occurring after $E_1$ in the set of all local extrema in the sample. We require that the two tops, $E_1$ and $E_a$, be within 1.5 percent of their average. Finally, following Edwards and Magee (1966), we require that the two tops occur at least a month, or 22 trading days, apart. Therefore, we have the following definition.

Definition 5 (Double Top and Bottom). Double tops (DTOP) and bottoms (DBOT) are characterized by an initial local extremum $E_1$ and a subsequent local extrema $E_a$ and $E_b$ such that $$E_a \equiv \sup\{P^*_{t^*_k} : t^*_k > t^*_1, k=2, \ldots, n\}$$

$$E_b \equiv \inf\{P^*_{t^*_k} : t^*_k > t^*_1, k=2, \ldots, n\}$$

and $$DTOP \equiv \begin{cases} \{E_1 \text{ is a maximum}\} \\ \{E_1 \text{ and } E_a \text{ are within 1.5 percent of their average}\} \\ \{t^*_a - t^*_1 > 22\} \end{cases}$$

$$DBOT \equiv \begin{cases} \{E_1 \text{ is a minimum}\} \\ \{E_1 \text{ and } E_b \text{ are within 1.5 percent of their average}\} \\ \{t^*_a - t^*_1 > 22\} \end{cases}$$

Our algorithm begins with a sample of prices $\{P_1, \ldots, P_T\}$ for which we fit kernel regressions, one for each subsample or window from t to $t+\int+d-1$, where t varies from 1 to $T-\int-d+1$, and $\int$ and d are fixed parameters whose purpose is explained below. In the empirical analysis of Section III, we set $\int=35$ and d=3, hence each window consists of 38 trading days.

The motivation for fitting kernel regressions to rolling windows of data is to narrow our focus to patterns that are completed within the span of the window–$\int+d$ trading days in our case. If we fit a single kernel regression to the entire dataset, many patterns of various durations may emerge, and without imposing some additional structure on the nature of the patterns, it is virtually impossible to distinguish signal from noise in this case. Therefore, our algorithm fixes the length of the window at $\int+d$, but kernel regressions are estimated on a rolling basis and we search for patterns in each window.

Of course, for any fixed window, we can only find patterns that are completed within $\int+d$ trading days. Without further structure on the systematic component of prices $m(\cdot)$, this is a restriction that any empirical analysis must contend with. We choose a shorter window length of $\int=35$ trading days to focus on short-horizon patterns that may be more relevant for active equity traders, and leave the analysis of longer-horizon patterns to future research.

The parameter d controls for the fact that in practice we do not observe a realization of a given pattern as soon as it has completed. Instead, we assume that there may be a lag between the pattern completion and the time of pattern detection. To account for this lag, we require that the final extremum that completes a pattern occurs on day $t+\int-1$; hence d is the number of days following the completion of a pattern that must pass before the pattern is detected. This will become more important in Section III when we compute conditional returns, conditioned on the realization of each pattern. In particular, we compute post-pattern returns starting from the end of trading day $t+\int+d$, i.e., one day after the pattern has completed. For example, if we determine that a head-and-shoulder pattern has completed on day $t+\int-1$ (having used prices from time t through time $t+\int+d-1$), we compute the conditional one-day gross return as $Z_1 \equiv Y_{t+\int+d+1}/Y_{t+\int+d}$. Hence, we do not use any forward information in computing returns conditional on pattern completion. In other words, the lag d ensures that we are computing our conditional returns completely out-of-sample and without any "look-ahead" bias.

Within each window, we estimate a kernel regression using the prices in that window, hence:

$$m_h(T) = \frac{\sum_{s=t}^{t+l+d-1} K_h(T-s)P_s}{\sum_{s=t}^{t+l+d-1} K_h(T-S)}, t = 1, \ldots, T-l-d+1, \quad (12)$$

where $K_h(z)$ is given in (8) and h is the bandwidth parameter (see Section C). It is clear that $m_h(T)$ is a differentiable function of T.

Once the function $m_h(T)$ has been computed, its local extrema can be readily identified by finding times T such that $Sgn(m'_h(T))=-Sgn(m'_h(T+1))$, where $m'_h$ denotes the derivative of $m_h$ with respect to T and $Sgn(\cdot)$ is the signum function. If the signs of $m'_h(T)$ and $m'_h(T+1)$ are +1 and −1, respectively, then we have found a local maximum, and if they are −1 and +1, respectively, then we have found a local minimum. Once such a time T has been identified, we proceed to identify a maximum or minimum in the original price series $\{P_t\}$ in the range [t−1, t+1], and the extrema in the original price series are used to determine whether or not a pattern has occurred according to the above definitions.

If $m'_h(T)=0$ for a given T, which occurs if closing prices stay the same for several consecutive days, we need to check whether the price we have found is a local minimum or maximum. We look for the date s such that $s=\inf\{s>T:m'_h(s) \neq 0\}$. We then apply the same method as discussed above, except here we compare $Sgn(m'_h(T-1))$ and $Sgn(m'_h(s))$.

One useful consequence of this algorithm is that the series of extrema which it identifies contains alternating minima and maxima. That is, if the k$^{th}$ extremum is a maximum, then it is always the case that the (k+1)$_{th}$ extremum is a minimum, and vice versa.

An important advantage of using this kernel regression approach to identify patterns is the fact that it ignores extrema that are "too local." For example, a simpler alternative is to identify local extrema from the raw price data directly, i.e., identify a price P$_t$ as a local maximum if P$_{t-1}$<P$_t$ and P$_t$>P$_{t+1}$, and vice versa for a local minimum. The problem with this approach is that it identifies too many extrema, and also yields patterns that are not visually consistent with the kind of patterns that technical analysts find compelling.

Once we have identified all of the local extrema in the window [t, t+∫+d−1], we can proceed to check for the presence of the various technical patterns using the definitions provided above. This procedure is then repeated for the next window [t+1, t+∫+d], and continues until the end of the sample is reached at the window [T−∫−d+1, T].

Although the invention has been described in detail for the purpose of illustration, it is to be understood that such detail is solely for that purpose and that variations can be made therein by those skilled in the art without departing from the spirit and scope of the invention.

What is claimed is:

1. A system for processing price data corresponding to a sequence of time for a selected interval and detecting one or more patterns in said price data, said system comprising:
   a database communicatively coupled to a data processor and a pattern recognition processor;
      said database comprising means for storing said price data in system addressable format;
      said data processor responsive to price data stored in said database and comprising means for generating data representing a non-linear function having a smooth, curvilinear characteristic for a range of data within said interval by applying to said price data a smoothing estimator whose parameters comprise a bandwidth, a window length, and a lag time;
      said pattern recognition processor in communication with said data processor, operable to receive said data corresponding to said non-linear function, and comprising means for analyzing said smoothed non-linear function to identify one or more patterns of price-time data and generating a results output based on a recognition of said one or more patterns; said pattern recognition processor further comprising means for detecting one or more broadening tops and broadening bottoms, and said results output comprising price movement projections based on said detected one or more broadening tops and broadening bottoms.

2. A system for processing price data corresponding to a sequence of time for a selected interval and detecting one or more patterns in said price data, said system comprising:
   a database communicatively coupled to a data processor and a pattern recognition processor:
      said database comprising means for storing said price data in system addressable format;
      said data processor responsive to price data stored in said database and comprising means for generating data representing a non-linear function having a smooth, curvilinear characteristic for a range of data within said interval by applying to said price data a smoothing estimator whose parameters comprise a bandwidth, a window length, and a lag time;
      said pattern recognition processor in communication with said data processor, operable to receive said data corresponding to said non-linear function, and comprising means for analyzing said smoothed non-linear function to identify one or more patterns of price-time data and generating a results output based on a recognition of said one or more patterns; said pattern recognition processor further comprising means for detecting one or more head and shoulders patterns, and said results output comprising price movement projections based on said detected one or more head and shoulders patterns.

3. A system for processing price data corresponding to a sequence of time for a selected interval and detecting one or more patterns in said price data, said system comprising:
   a database communicatively coupled to a data processor and a pattern recognition processor:
      said database comprising means for storing said price data in system addressable format;
      said data processor responsive to price data stored in said database and comprising means for generating data representing a non-linear function having a smooth, curvilinear characteristic for a range of data within said interval by applying to said price data a smoothing estimator whose parameters comprise a bandwidth, a window length, and a lag time;
      said pattern recognition processor in communication with said data processor, operable to receive said data corresponding to said non-linear function, and comprising means for analyzing said smoothed non-linear function to identify one or more patterns of price-time data and generating a results output based on a recognition of said one or more patterns; said pattern recognition processor further comprising for detecting one or more triangle tops and triangle bottoms, and said results output comprising price movement projections based on said detected one or more triangle tops and triangle bottoms.

4. A system for processing price data corresponding to a sequence of time for a selected interval and detecting one or more patterns in said price data, said system comprising:
   database communicatively coupled to a data processor and a pattern recognition processor:
      said database comprising means for storing said price data in system addressable format;
      said data processor responsive to price data stored in said database and comprising means for generating data representing a non-linear function having a smooth, curvilinear characteristic for a range of data within said interval by applying to said price data a smoothing estimator whose parameters comprise a bandwidth, a window length, and a lag time;
      said pattern recognition processor in communication with said data processor, operable to receive said data corresponding to said non-linear function, and comprising means for analyzing said smoothed non-linear function to identify one or more patterns of price-time data and generating a results output based on a recognition of said one or more patterns; and said pattern recognition processor further comprising means for detecting one or more rectangle tops and rectangle bottoms, and said results output comprising price movement projections based on said detected one or more rectangle tops and rectangle bottoms.

5. A system for processing price data corresponding to a sequence of time for a selected interval and detecting one or more patterns in said price data, said system comprising:
   a database communicatively coupled to a data processor and a pattern recognition processor:

said database comprising means for storing said price data in system addressable format;

said data processor responsive to price data stored in said database and comprising means for generating data representing a non-linear function having a smooth, curvilinear characteristic for a range of data within said interval by applying to said price data a smoothing estimator whose parameters comprise a bandwidth, a window length, and a lag time;

said pattern recognition processor in communication with said data processor, operable to receive said data corresponding to said non-linear function, and comprising means for analyzing said smoothed non-linear function to identify one or more patterns of price-time data and generating a results output based on a recognition of said one or more patterns; said pattern recognition processor further comprising means for detecting one or more double tops and double bottoms, and said results output comprising price movement projections based on said detected one or more double tops and double bottoms.

* * * * *